Sept. 7, 1926.   1,598,610
F. X. HUFSCHMIDT
SHUTTER FOR AUTOMOBILE RADIATORS
Filed Sept. 21, 1922   2 Sheets-Sheet 1
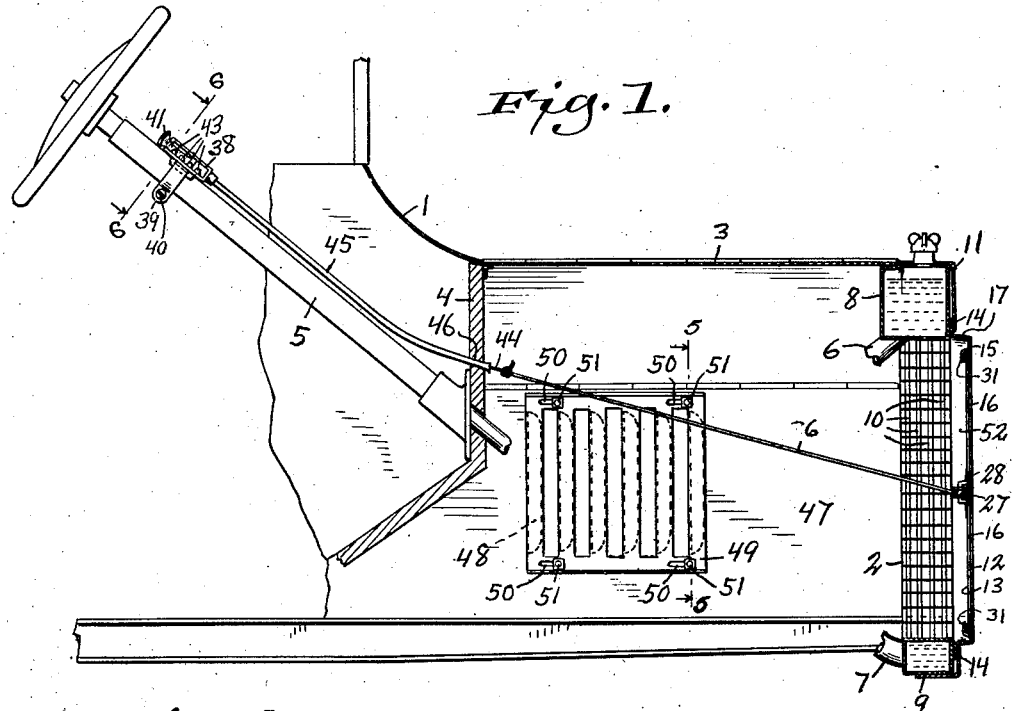
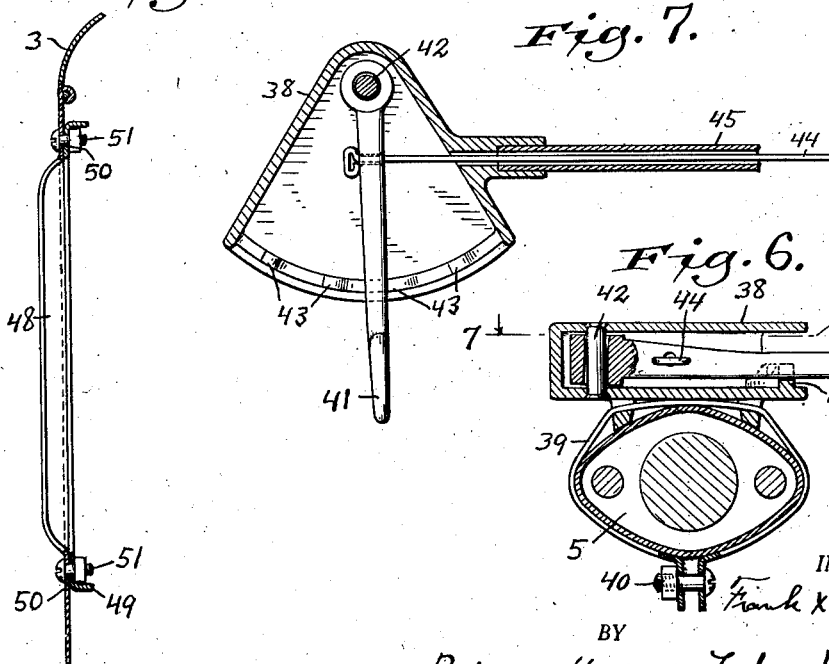
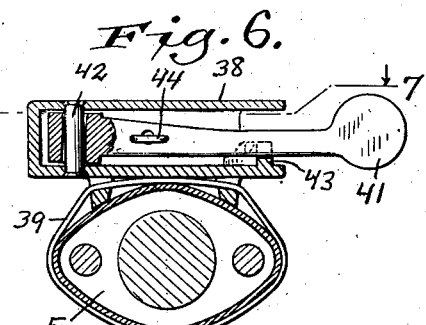
INVENTOR.
Frank X. Hufschmidt
BY
ATTORNEYS.

Sept. 7, 1926.
F. X. HUFSCHMIDT
SHUTTER FOR AUTOMOBILE RADIATORS
Filed Sept. 21, 1922   2 Sheets-Sheet 2
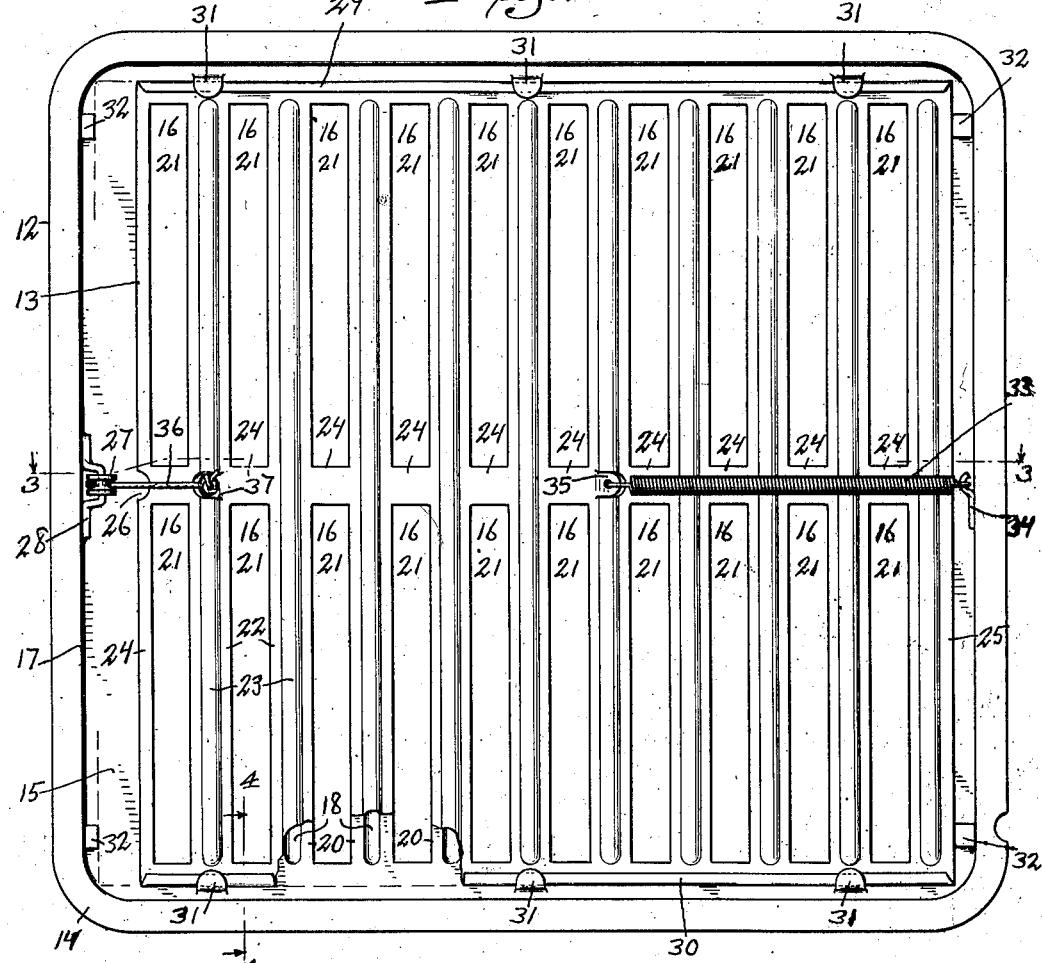
Fig. 2.
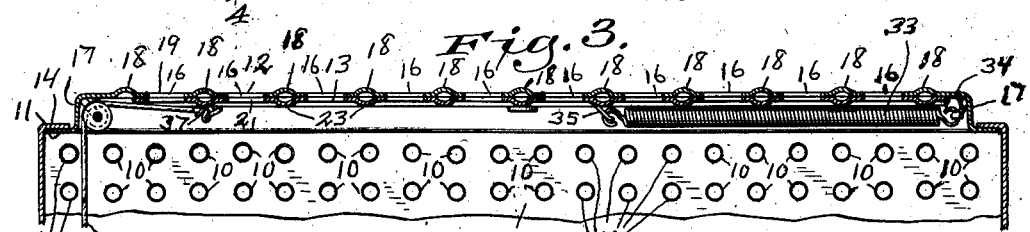
Fig. 3.
Fig. 4.
INVENTOR.
Frank X. Hufschmidt
BY
Bottum, Hudnall, Lecher & McNamara
ATTORNEYS.

Patented Sept. 7, 1926.

1,598,610

UNITED STATES PATENT OFFICE.

FRANK X. HUFSCHMIDT, OF MILWAUKEE, WISCONSIN, ASSIGNOR OF ONE-HALF TO WILLIAM H. DUSOLD, OF MILWAUKEE, WISCONSIN.

SHUTTER FOR AUTOMOBILE RADIATORS.

Application filed September 21, 1922. Serial No. 589,612.

This invention relates to shutters for automotive vehicles and the like and the object of the invention is to improve the construction and operation of shutters for automotive vehicles and the like in the manner to be hereinafter described and claimed.

Referring to the drawings which accompany this specification and form a part hereof, which drawings illustrate an embodiment of this invention, and on which drawings the same reference characters are used to designate the same parts wherever they may appear in the several views, Fig. 1 is a vertical, longitudinal section of parts of an automotive vehicle; Fig. 2 is a rear elevation of a front shutter detached from the vehicle, parts being broken away; Fig. 3 is a cross section of the shutter secured to the vehicle, the section being taken on the line 3—3 on Fig. 2, looking in the direction indicated by the arrows; Fig. 4 is a vertical section of parts of the front shutter, taken on the line 4—4 on Fig. 2, looking in the direction indicated by the arrows; Fig. 5 is a vertical, transverse section, taken on the line 5—5 on Fig. 1, looking in the direction indicated by the arrows; Fig. 6 is a section taken on the line 6—6 on Fig. 1, looking in the direction indicated by the arrows; and Fig. 7 is a section taken on the line 7—7 on Fig. 6, looking in the direction indicated by the arrows.

Referring to the drawings, the reference numeral 1 designates an automotive vehicle which is provided with the radiator 2 at the front of an engine hood 3. The reference numeral 4 designates the dash-board and 5 the steering-column. The pipe 6 permits the heated water to rise from the engine water jacket to the top of the radiator and the pipe 7 conducts the cooled water from the radiator to the engine water-jacket in the well-known manner. The radiator 2 may be of any construction, the specific type of construction illustrated by the drawings comprising an upper manifold 8 and a lower manifold 9 connected by vertical pipes 10. The radiators, in automobiles particularly, are enclosed by radiator casings 11 for neatness of appearance, and such radiator casings are, ordinarily, readily removable.

The shutter consists of a stationary part 12 and a movable part 13, which may be appropriately designated, respectively, as a support and a slide. The support 12 is substantially rectangular and may be stamped from a single piece of sheet metal with a flange 14 and a dished or offset face 15 which is provided with a plurality of apertures 16. The rim 17 is at substantially right angles with the flange 14 and the face 15 to afford the maximum strength, or rather stiffness, to prevent distortion. The vertical strips between the apertures 16 are provided with outstanding beads 18 to provide for stiffness, and it is preferred to leave anchor pieces 19 uniting the vertical strips 20 with the sides of the face 15, as will be readily understood from an inspection of the drawings. The slide 13 is preferably stamped from a single sheet of metal and is provided with apertures 21 of the same size and shape as the apertures 16 in the face 15 so that the apertures 21 in the slide 13 may be made to register with the apertures 16 in the face 15 to permit the maximum volume of air to pass through these apertures. The vertical strips 22 of the slide are provided with outstanding beads 23 to provide for stiffness and it is preferred that the beads 18 and 23 shall extend substantially the entire lengths of their respective vertical strips. Anchor pieces 24 are left to unite the vertical strips 22 of the slide and its side members 24 and 25 in line with the anchor pieces 19 of the face and for the same reason. The edge 25 of the slide 13 may obviously be formed similar to and function just the same as one of the vertical strips 22, while the edge 24 may be formed in any desired manner. The edge 24 is shown by the drawings as left flat, for cheapness of construction but provided with a notch 26 to clear a pulley wheel 27 which is supported by a bracket 28 fastened to the rim 17. The upper and lower edges of the slide 13 are bent over into folds 29 and 30 for the sake of stiffness and to provide good sliding surfaces within the clips 31 which are preferably punched from the support 12 adjacent the upper and lower edges thereof and bent backwardly and then bent over to embrace the folds 29 and 30 losely enough to permit the slide 13 to be reciprocated back and forth while being retained in close contact with the rear of the face 15. The vertical strips 22 of the slide 13 should be wide enough to cover the apertures 16 in the support 12 and the vertical strips 20 of the face 15 should be wide enough to cover the apertures 21 in the slide 13 but, otherwise, the apertures 16 and 21 should be as wide as possible to secure the maximum aperture area for the passage of air. Due to the fact that the support 12 has rounding corners, it is preferred to provide the support 12 with stops 32 to provide for absolutely accurate limits of movement for the slide 13. A spring 33 is secured at one end to a hook 34 attached to the rim 17 and is secured at its opposite end to a lip 35 punched out from the slide 13, so as to retain the slide 13 in its open position and to return the slide 13 to its open position, unless retained under tension by some means. A flexible member 36 is connected with an ear or lip 37 punched from the slide 13 and passes around the pulley wheel 27 to a convenient point for manipulation.

The drawings illustrate a lever-box 38 clamped to the steering column 5 by a metallic strap 39 and a bolt 40. A lever 41 is loosely pivoted upon a pivot 42 so that it can be lifted over teeth 43 to engage in the notches between the teeth. Preferably the under sides of the teeth 43 are inclined upwardly, see Figs. 1 and 7 of the drawings, so that a pull on the lever 41 is all that is necessary to swing the lever upwardly, while to move the lever downwardly the lever must be lifted over a tooth or teeth. A wire 44 is connected to the lever 41 and to the flexible member 36 and it will be readily understood that pulling the lever 41 upwardly, see Fig. 1 of the drawings, will pull the flexible member 36 and close the slide 13 and stretch the spring 33, while a downward movement of the lever 41 will permit the spring 33 to contract and close the slide 13. The slide 13 can be permitted to remain in any intermediate position between full open and full closed positions according to the number of teeth 43 provided for intermediate positions of adjustment. A tube 45 may be used for neatness of appearance and as a fair-leader for the wire 44 and one end of this tube may be secured in the lever-box 38 and the other end in an aperture 46 provided in the dash-board 4 therefor.

The primary object of the invention is to maintain a predetermined temperature condition of the engine and thereby save fuel or gasoline in cold weather and prevent the lubricant from becoming unduly chilled whereby the efficiency of the engine is maintained under adverse temperature conditions. The engine space 47 within the hood 3 can be closed by closing the slide 13 and by closing the louvre openings 48, in the sides of the hood 3, by movable registers 49 which may be provided with slots 50 and held in place on the hood by bolts 51. In this manner circulation of air through the hood may be prevented and the heated air retained in the hood when the car is parked or during the night, or other time, in the garage. It is recommended that a low-temperature freezing substance or composition be dissolved in or mixed with the water which circulates through the water-jacket of the engine and the radiator, during cold weather, as, while this invention incidentally tends to prevent freezing, its principal object is to maintain a predetermined temperature condition of the engine while the engine is running. The stationary part or support 12 can be attached to the vehicle in any convenient manner. By removing the radiator casing 11 and replacing it with the flange 14 retained between the radiator 2 and the radiator casing 11, as clearly shown by Figs. 1 and 3 of the drawings, or in any suitable and convenient manner.

The offsetting of the face 15 is an important feature of construction and principle of operation as it provides an unobstructed air space 52 between the shutter and the radiator so that the air has free access to all parts of the radiator and no parts of the radiator are blanked by the shutter, with the result that no part of the radiator is short circuited.

The beads 18 of the stationary part or support 12 and the beads 23 of the slide 13 afford great strength or stiffness to the shutter as they in effect coact with each other to produce tubular uprights, when the slide 13 is fully open, and semi-tubular uprights, when the slide 13 is fully closed, thus giving the greatest strength with the minimum amount of metal, so that the shutter can be made of thin sheet metal and be given the necessary strength and rigidity.

It is to be understood that the hood 3 is to be closed substantially air tight so that the only places for ingress or egress of air will be the openings adapted to be controlled by the slide 13 and the registers 49. Some vehicles are so constructed that air spaces exist under the radiators or around the motors, and any such spaces should be closed to obtain the full benefit and advantage of this invention.

What is claimed is:

In a shutter for an automobile radiator, in combination, a substantially rectangular support provided with apertures, and a slide supported by said support for sliding movement with respect thereto, the upper and lower edges of said slide being bent over to provide folds, said support being provided with clips arranged adjacent the upper and lower edges thereof, said clips being punched from said support and bent to embrace said folds.

In witness whereof I hereto affix my signature.

FRANK X. HUFSCHMIDT.